Jan. 6, 1970     D. H. HOHNSTEIN     3,488,754

DYNAMOELECTRIC MACHINE RIM CONSTRUCTION WITH OFFSET RING SEGMENTS

Filed Dec. 10, 1968

Inventor
Dean H. Hohnstein
By John C. Hines
Attorney

United States Patent Office 3,488,754
Patented Jan. 6, 1970

3,488,754
DYNAMOELECTRIC MACHINE RIM CONSTRUCTION WITH OFFSET RING SEGMENTS
Dean H. Hohnstein, Brookfield, Wis., assignor to Allis-Chalmers Manufacturing Company, Milwaukee, Wis.
Filed Dec. 10, 1968, Ser. No. 782,616
Int. Cl. H02k 1/22
U.S. Cl. 310—216                                  4 Claims

ABSTRACT OF THE DISCLOSURE

Large dynamoelectric machine rims are made up of a plurality of stacked rings composed of a plurality of arcuate ring segments. This invention is directed to the configuration of the individual ring segments, wherein one construction feature (i.e. dovetail slots, keyways, etc.) would be spaced from an adjacent end of the segment by a distance less than half the distance between adjacent features, and the construction feature adjacent the other end of the ring segment would be spaced such a distance from said other end that the sum of said distance would equal the distance between adjacent features minus the clearance between adjacent segments.

---

This invention pertains in general to large dynamoelectric machines and more particularly to the rim ring segments.

Although this invention will be described in connection with rotor rims, it should be understood it is equally applicable to any ring assembly that is made up of a plurality of stacked rings composed of a plurality of arcuate ring segments where the strength of the assembly is of concern.

Rotor rims for large dynamoelectric machines vary greatly in size from as small as 2 feet in axial length, 9 feet in diameter, to as large as 11 feet in axial length and 63 feet in diameter. Because of their large size, it is not practical to construct the generator rotor rim out of a plurality of circular rings. Instead, each ring is made up of a plurality of arcuate ring segments. In most cases, for obvious economical reasons, each ring segment is constructed of an identical configuration. Each rotor ring has a number of identical features as for instance, dovetail shaped slots on their OD for attaching field poles to the assembled rim. The rotor rim is assembled by staggering the joints between ring segments of successive rings. Thus, if a ring segment has four dovetail slots therein, and if the joints between ring segments of successive rings are staggered one-fourth of a ring segment, joints between the ring segments will axially align themselves every fourth ring. Because of these joints, the assembly is not as strong as it would be if solid rings were used.

It is, therefore, the intention and general object of this invention to devise a ring segment which will permit the stacking of a greater number of rings without causing the joints between adjacent ring segments to axially align with other ring segment joints.

A more specific object of the subject invention is to provide a dynamoelectric machine ring segment which has indentical features of construction but which features of construction are not centrally located on the ring segment.

These and other objects of the subject invention will become more fully apparent as the following description is read in light of the attached drawing which shows developed views of a stack of arcuate rotor ring segments laid out straight to better illustrate the invention.

Figure 1:
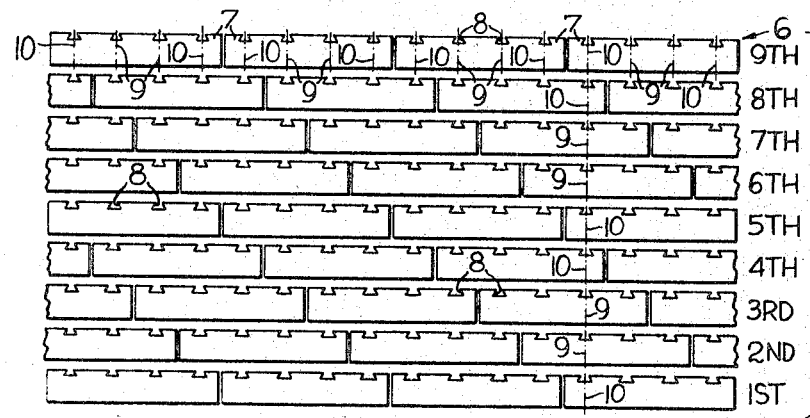
FIG. 1 is an axial view of a portion of a rim of stacked ring segments of the prior art, the successive rings being shown radially displaced in the drawing instead of stacked axially one on top of the other for better illustration.

Each ring 6 is composed of a plurality of identical ring segments 7 herein shown for purposes of illustration as being composed of four ring segments. Each ring segment 7 is also provided with a plurality of equally spaced features herein shown as dovetail shaped slots 8 on the radially outer peripheral surface of the segment. As herein shown for purposes of illustration, each ring segment comprises four such slots.

In addition to the dovetail slots 8 each ring segment 7 would in most cases also be provided with axial keyways on the inner peripheral surface thereof for attaching the assembled rim to a rotor spider or hub. Furthermore, each ring segment would in most cases also be provided with axial holes for through-bolts which hold the assembly together. These holes and keyways or features (not shown) would also be repeated in each ring segment in the same manner as the dovetail slots 8.

Thus, there are repeating identical groups or patterns of these features, herein called construction feature patterns. The construction feature pattern and its location will herein be illustrated by a centerline 9 rather than illustrating the entire pattern. The construction feature pattern may or may not be symmetrical about the centerline.

The end CFP's 10 are spaced from the adjacent end of the ring segment a distance equal to one-half the distance between adjacent CFP's.

Figure 2:
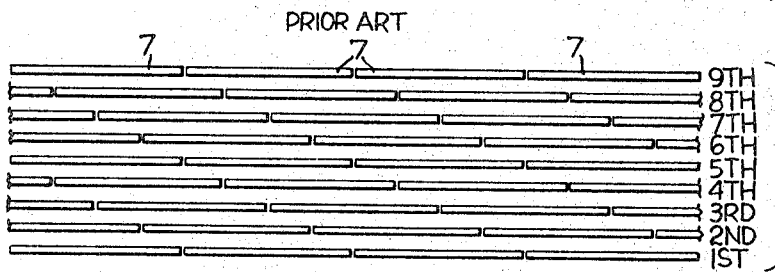
FIG. 2 is a radial view of FIG. 1.

The rotor rim is assembled by first laying out one ring of ring segments and then staggering each successive layer of segments by offsetting such successive layers in an amount equal to $1/n$ of a segment with respect to the previous layer; $n$ being the number of CFP's 9 in each segment 7. The end result is a rim assembly with a joint aligning with another joint in the axial direction every $n$th number of rings. As shown in FIGS. 1 and 2, this joint repeats itself every fourth ring. Because of these joints the assembly is not as strong as a solid piece. Its strength, instead, is diminished by an amount $1/n$ and the ring is said to have a joint efficiency of $$\left(\frac{n-1}{n} \times 100\%\right)$$

Thus, a typical rim with four CFP's 9 per segment 7 will have joint efficiency of $$\left(\frac{4-1}{4} \times 100\right) = 75\%$$

Figure 3:
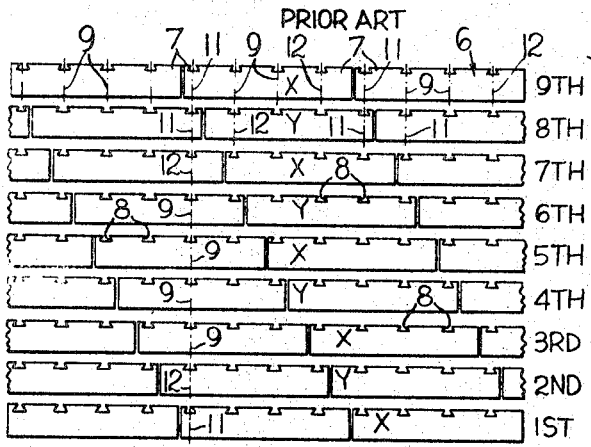
FIG. 3 is an axial view of a portion of a rim of stacked ring segments constructed in accordance with the invention, the successive rings being shown radially displaced in the drawing instead of stacked axially one on top of the other so as to better illustrate the invention.
Figure 4:
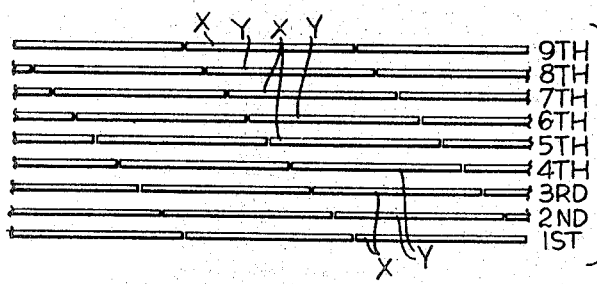
FIG. 4 is a radial view of FIG. 3.

Referring now to FIGS. 3 and 4, each ring segment 7 like the prior art is provided with four equally spaced CFP's 9. However, one end CFP 11 is spaced a distance from the adjacent end of the ring segment a distance less than half the distance between adjacent CFP and the other end CFP 12 is spaced a distance from the adjacent end of the ring segment an amount such that when added to the other end distance the sum is equal to the distance between CFP minus the clearance between adjacent ring segments.

As shown herein for purposes of illustration, this group of CFP's is offset on each ring segment by an amount by an amount equal to one-quarter of the distance between adjacent CFP 9. The rim of my invention is assembled by first laying out one ring of ring segment with the X side up as shown in FIG. 3. The next layer of ring segments is laid on top of the first layer with the opposite side or Y side of the segment up. This second layer of ring segments is staggered with respect to the first layer in an amount equal of $½n$ of the segment wherein $n$ is the number of CFP's per ring segment. Each successive layer of segments is placed on the stack with the side up opposite to the side that was up on the previous layer and with the layer staggered $½n$ of a segment with respect to the previous layer. The end result is a rim assembly with a joint or split occurring once every $2n$ rings in the axial direction. The strength of the assembly is diminished by an amount $½n$ and the assembly has a joint efficiency $$\left(\frac{2n-1}{2n} \times 100\%\right)$$

Thus a typical rim assembly with four CFP's per ring segment would have a joint efficiency of $$\left(\frac{8-1}{8} \times 100 = 87.5\%\right)$$

Rotor rims are usually sized to contain a given force by stressing the material to a specified limit. The effect of building a rim with a higher joint efficiency would be to reduce the size of rim required and thus reduce the material and fabrication costs of the rim. A reduction in rim weight would also in many cases have the effect of reducing the size and costs of other components of a generator.

Although only one embodiment of the subject invention has been herein shown and described, other embodiments will be apparent to those skilled in the art after reading this description, and it is intended that all such embodiments as come within a reasonable interpretation of the appended claims be covered.

The embodiments of the invention in which an exclusive property or privilege is claimed are defined as follows:

1. A rim for a dynamoelectric machine including a plurality of stacked rings each composed of a plurality of arcuate ring segments with each ring segment having a plurality of construction features equally spaced from one another, one end feature being spaced from the adjacent end of the ring segment a distance less than one-half the distance between adjacent features and the other end feature being spaced from the adjacent end of the ring segment a distance such that such end distance when added to the other end distance is equal to the distance between adjacent features minus the clearance between adjacent ring segments.

2. The dynamoelectric machine rim set forth in claim 1 wherein the ring segments of each successive ring are inverted relative to the adjacent rings thereby reversing the ring segment features on each successive ring.

3. The dynamoelectric machine rim set forth in claims 1 and 2 wherein each ring segment is staggered relative to the ring segment in the previous ring an amount equal to the shortest distance between an end feature and the adjacent end of a ring segment.

4. An arcuate ring segment for the rim of a dynamoelectric machine having a plurality of construction features equally spaced from one another, one end feature being spaced from the adjacent end of the ring segment a distance less than one half the distance between adjacent features and the other end feature being spaced from the adjacent end of the ring segment a distance such that such end distance when added to the other end distance is equal to the distance between adjacent features minus the clearance between adjacent ring segments.

References Cited

UNITED STATES PATENTS

| 1,687,512 | 10/1928 | Reist | 310—269 X |
| 3,280,355 | 10/1966 | Ruella et al. | 310—269 |
| 3,307,059 | 2/1967 | Kitano et al. | 310—216 |

J D MILLER, Primary Examiner

D. F. DUGGAN, Assistant Examiner

U.S. Cl. X.R.

310—269